United States Patent Office 3,780,006
Patented Dec. 18, 1973

3,780,006
REMOVAL OF MONOMER FROM ACRYLAMIDE POLYMERS WITH SULFUR DIOXIDE
Maurice L. Zweigle, Midland, Mich., assignor to The Dow Chemical Company, Midland, Mich.
No Drawing. Filed Oct. 26, 1971, Ser. No. 192,640
Int. Cl. C08f 3/90, 15/02, 47/00
U.S. Cl. 260—89.7 R         5 Claims

ABSTRACT OF THE DISCLOSURE

Residual unreacted acrylamide is removed from water-soluble and water-swellable polymers and copolymers of acrylamide by treating the polymer with at least one mole of sulfur dioxide per mole of residual monomer. Polymers containing ten parts per million or less of monomer are thereby obtainable.

BACKGROUND OF THE INVENTION

This invention relates to a method for producing polymers of acrylamide which are essentially free of residual unreacted monomer.

Polymerization of acrylamide and similar water-soluble monomers can be accomplished by a number of methods including mass polymerization, polymerization in aqueous solution, and suspension methods whereby the monomer or its aqueous solution is emulsified or suspended in a liquid dispersion medium and the suspended monomer is subjected to polymerizing conditions to obtain a corresponding suspension of polymer particles. In any of these procedures, polymerization may approach completion, but there remains a small amount of residual unreacted monomer. In the case of acrylamide which is a relatively toxic compound, the presence of even small amounts of monomer may be a serious problem in applications where the polymer is handled with risk of skin contact, where it is used to clarify water that may later find its way into a municipal water supply, or where it is used in the manufacture of paper for packaging foodstuffs.

It is known that residual monomeric acrylamide can be largely removed from its polymers by treatment with a sulfite such as sodium sulfite or bisulfite, see Pye, U.S. 2,960,486. This method of treatment is effective and is particularly adapted to convenient use in solution polymerization techniques. However, residual monomer is reduced only to a minimum of about 50–200 parts per million by this treatment. Also, in an inverse suspension or water-in-oil suspension process for polymerizing acrylamide or its mixtures with other water-soluble monomers where the polymerized mixture is essentially a suspension of small globules of polymer in a hydrophobic organic liquid, treatment of the mixture with sulfite is found to be relatively ineffective for reducing residual monomer content to the extremely low levels required in some applications.

SUMMARY OF THE INVENTION

It has now been found that homopolymers of acrylamide and its copolymers with other water-soluble monoethylenically unsaturated monomers containing as little as ten parts per million or less of unreacted monomeric acrylamide can be obtained by contacting the polymer under neutral or acidic conditions with at least about one mole of sulfur dioxide per mole of monomeric acrylamide, the sulfur dioxide being the sole added reactive ingredient. The sulfur dioxide treatment can be applied to the polymer in any convenient form including particulate polymer, polymer dissolved in or swollen by a solvent, or a dispersion of polymer in a nonsolvent. Preferably, the sulfur dioxide is contacted with a polymerization process mixture and the treatment is particularly and unexpectedly advantageous as compared to the known treatment with alkali metal sulfite when the process mixture is the product of an inverse or water-in-oil suspension polymerization process. In this kind of process, a suspension of monomer or aqueous monomer is formed in an inert hydrophobic liquid organic dispersion medium with the aid of a water-in-oil suspending agent and the suspended monomer is then subjected to polymerizing conditions, thereby producing a disperse phase polymeric product in particulate form.

DETAILED DESCRIPTION

This new method wherein sulfur dioxide is introduced into the polymerization mixture as the sole added reactive component is particularly convenient and easy to use since the added material is an easily handled and measured gas which can be bubbled into the liquid mixture with little or no additional agitation necessary to insure uniform dispersion. Sulfur dioxide can be added at any convenient temperature from about zero to 100° C., preferably at 20–80° C. Contact time is not particularly critical since dispersion of the gas through the mixture is rapid and the reaction takes place almost immediately upon contact. Treatment times of 0.1–2 hours are typical. Similarly, the quantity of sulfur dioxide is not critical so long as at least about a mole per mole of unreacted monomer is employed. Normally, a moderate excess of $SO_2$ is used, for example 1–2 moles.

The polymers particularly adapted to treatment by this process are the polymers and copolymers of acrylamide with up to about 70 mole percent of another water-soluble monoethylenically unsaturated monomer. Such comonomers include acrylic acid, methacrylic acid, methacrylamide, vinylbenzyl trimethylammonium chloride, vinylbenzenesulfonic acid, maleic acid, 2-sulfoethyl acrylate, 2-sulfoethyl methacrylate, N-(amino-lower alkyl)acrylamides such as N-(2-aminoethyl)acrylamide, N-(2-dimethylaminoethyl)acrylamide, the corresponding substituted methacrylamides and aminoalkyl acrylates and methacrylates such as dimethylaminoethyl methacrylate. These polymers are characteristically of moderate to high molecular weight and are either substantially linear and water-soluble or slightly cross-linked by reaction with a diene cross-linking reagent such as N,N'-methylenebisacrylamide and so are water-swellable rather than water-soluble.

The example illustrates the application of the invention to a copolymer of acrylamide and dimethylaminoethyl methacrylate.

EXAMPLE

A water-in-oil suspension copolymerization of acrylamide was carried out under acidic conditions as follows:

Aqueous phase

Quantities of 288 g. of acrylamide and 72 g. of dimethylaminoethyl methacrylate were dissolved in 333 ml. of water along with 50 g. conc. HCl, 15 g. of sodium sulfate, and 0.72 Versenex 80 (pentasodium salt of diethylenetriaminepentaacetic acid) to make a solution of pH 4.5.

Oil phase

The oil phase was a solution of 45 g. of trimethyl octadecylammonium chloride in 750 g. of kerosene.

Polymerization and $SO_2$ treatment

The oil phase and aqueous phase were mixed and passed through a homogenizer to obtain a stable suspension. Polymerization was effected by adding 100 p.p.m. tert-butyl hydroperoxide and 200 p.p.m. sodium metabisulfite based on total monomer to the stirred suspension at 25° C. under adiabatic conditions. The resulting fine polymer bead suspension was then contacted with about 5.8 g. of gaseous $SO_2$ by bubbling the gas through the suspension. The separated polymer beads contained 40 p.p.m. residual monomeric acrylamide. When the above procedure was repeated without the $SO_2$ treatment, the polymer product contained 3.2% by weight acrylamide monomer.

In contrast to the above results, unreacted acrylamide was reduced from an original 0.5–1 percent only to 470 parts per million based on the weight of polymer when a solution polymerization-produced polyacrylamide was treated at pH 6.9–7 with 0.5 percent by weight of sodium bisulfite in 5% aqueous solution. The somewhat gelatinous polymerization product had been obtained by mixing 300 p.p.m. $Na_2S_2O_8$ and 300 p.p.m. tert-butyl hydroperoxide based on monomer with 13% aqueous acrylamide and the linear polymer thereby produced had an average molecular weight of about 5–7 million.

I claim:

1. A process for removing residual monomeric acrylamide from a polymer of acrylamide, said polymer being a homopolymer of acrylamide or a copolymer of acrylamide with at least one other water-soluble monoethylenically unsaturated monomer, which comprises contacting said polymer under neutral or acidic conditions with at least about one mole of sulfur dioxide per mole of monomeric acrylamide in the substantial absence of other substances reactive with sulfur dioxide.

2. The process of claim 1 wherein the polymer structure consists essentially of chemically combined acrylamide units.

3. The process of claim 1 wherein the polymer is a copolymer of acrylamide with at least one other water-soluble monoethylenically unsaturated monomer.

4. The process of claim 1 wherein a dispersion of polymer beads in an inert hydrophobic organic liquid is contacted with gaseous $SO_2$.

5. The process of claim 4 wherein the polymer dispersion is the product of an inverse suspension polymerization process.

References Cited

UNITED STATES PATENTS

| | | | |
|---|---|---|---|
| 2,770,603 | 11/1956 | Lynch | 260—29.7 |
| 2,960,486 | 11/1960 | Pye | 260—45.7 |

JOSEPH L. SCHOFER, Primary Examiner

C. A. HENDERSON, Jr., Assistant Examiner

U.S. Cl. X.R.

260—79.3 MU, 80.3 N, 85.5 S, 561 S